US011755421B2

(12) United States Patent
Chopra et al.

(10) Patent No.: US 11,755,421 B2
(45) Date of Patent: Sep. 12, 2023

(54) SYSTEM AND METHOD FOR RANKING DATA STORAGE DEVICES FOR EFFICIENT PRODUCTION AGENT DEPLOYMENT (71) Applicant: EMC IP Holding Company LLC, Hopkinton, MA (US)

(72) Inventors: Shelesh Chopra, Bangalore (IN); Sharath Talkad Srinivasan, Bengaluru (IN); Rahul Deo Vishwakarma, Kolkata (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 238 days.

(21) Appl. No.: 17/355,326

(22) Filed: Jun. 23, 2021

(65) Prior Publication Data
US 2022/0382645 A1 Dec. 1, 2022

(30) Foreign Application Priority Data
May 27, 2021 (IN) .............................. 202141023621

(51) Int. Cl.
*G06F 11/14* (2006.01)
(52) U.S. Cl.
CPC ...... *G06F 11/1461* (2013.01); *G06F 11/1458* (2013.01); *G06F 2201/84* (2013.01)

(58) Field of Classification Search
None
See application file for complete search history.

(56) References Cited
U.S. PATENT DOCUMENTS

| 10,754,368 | B1 * | 8/2020 | Chopra | G06F 11/3055 |
| 2020/0233755 | A1 * | 7/2020 | Bansal | G06F 11/1464 |
| 2021/0240575 | A1 * | 8/2021 | Mulheren | G06F 11/1456 |

* cited by examiner

*Primary Examiner* — Eddy Cheung
(74) *Attorney, Agent, or Firm* — Chamberlain, Hrdlicka, White, Williams, & Aughtry (57) ABSTRACT A method for processing backup policy generation requests includes receiving, by a production agent manager, a backup policy generation request, in response to receiving the backup policy generation request: identifying a backup to transfer to a backup storage, wherein the backup comprises a plurality of data blocks, performing a data storage device evaluation on a set of data storage devices to obtain a set of health scores, wherein each health score of the set of health scores corresponds to a data storage device of the set of data storage devices, assigning, based on the set of health scores, a production agent to a data storage device of the set of data storage devices to generate a backup policy, and initiating, based on the backup policy, a deployment of the production agent to the data storage device.

20 Claims, 6 Drawing Sheets

SYSTEM AND METHOD FOR RANKING DATA STORAGE DEVICES FOR EFFICIENT PRODUCTION AGENT DEPLOYMENT

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing, storage, and network use. The utilization of the aforementioned computing resources to generate backups may impact the overall performance of the computing resources.

SUMMARY

In general, in one aspect, the invention relates to a method for managing backup policy generation requests. The method includes receiving, by a production agent manager, a backup policy generation request, in response to receiving the backup policy generation request: identifying a backup to transfer to a backup storage, wherein the backup comprises a plurality of data blocks, performing a data storage device evaluation on a set of data storage devices to obtain a set of health scores, wherein each health score of the set of health scores corresponds to a data storage device of the set of data storage devices, assigning, based on the set of health scores, a production agent to a data storage device of the set of data storage devices to generate a backup policy, and initiating, based on the backup policy, a deployment of the production agent to the data storage device.

In general, in one aspect, the invention relates to a system that includes a processor and memory that includes instructions, which when executed by the processor, perform a method. The method includes receiving, by a production agent manager, a backup policy generation request, in response to receiving the backup policy generation request: identifying a backup to transfer to a backup storage, wherein the backup comprises a plurality of data blocks, performing a data storage device evaluation on a set of data storage devices to obtain a set of health scores, wherein each health score of the set of health scores corresponds to a data storage device of the set of data storage devices, assigning, based on the set of health scores, a production agent to a data storage device of the set of data storage devices to generate a backup policy, and initiating, based on the backup policy, a deployment of the production agent to the data storage device.

In general, in one aspect, the invention relates to a non-transitory computer readable medium that includes computer readable program code, which when executed by a computer processor enables the computer processor to perform a method. The method includes receiving, by a production agent manager, a backup policy generation request, in response to receiving the backup policy generation request: identifying a backup to transfer to a backup storage, wherein the backup comprises a plurality of data blocks, performing a data storage device evaluation on a set of data storage devices to obtain a set of health scores, wherein each health score of the set of health scores corresponds to a data storage device of the set of data storage devices, assigning, based on the set of health scores, a production agent to a data storage device of the set of data storage devices to generate a backup policy, and initiating, based on the backup policy, a deployment of the production agent to the data storage device.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for managing a data protection environment. Specifically, embodiments of the invention relate to methods for ranking data storage devices in a production host environment. The data storage devices may be ranked based on characteristics of the data storage devices. Examples of characteristics include, but are not limited to: a status of a data storage device (e.g., on or off), a state of the data storage device (e.g., available, unavailable), whether the data storage device is part of a cluster, consumption of processing power (e.g., of a central processing unit (CPU)), consumption of memory, uptime, a virtual machine file system version, a type of storage device (e.g., hard disk drive (HDD), solid state drive (SSD), etc.), a total capacity of the data storage device, available capacity of the data store, storage read and write rates, and number of virtual machines (VMs) assigned to the data storage device. The rankings may be used for the assignment of production agents to the data storage devices.

In one or more embodiments of the invention, the characteristics are evaluated using a shapely additive explanation (SHAP) model. The SHAP model may be a measurement of relatability between two or more characteristics. The relatability of the characteristics of the data storage devices may be used to determine a feature value of each characteristic. Each feature value may be a measurement of the effect that the parameter may have on the ranking of a data storage device.

In one or more embodiments of the invention, the ranking of the data storage devices are ranked by obtaining health scores for each data storage device based on the feature values of the characteristics of the corresponding data storage devices. The data storage devices are ranked based on the generated health scores.

In one or more embodiments of the invention, the ranking of the data storage devices are used to assign production agents producing backups of virtual machines to each data storage device. For example, the production agents may be first assigned to the higher-ranked data storage devices. Later-assigned production agents may be assigned to the lower-ranked data storage devices. Other determinations for assigning the production agents to the data storage devices may be used without departing from the invention.

Figure 1:
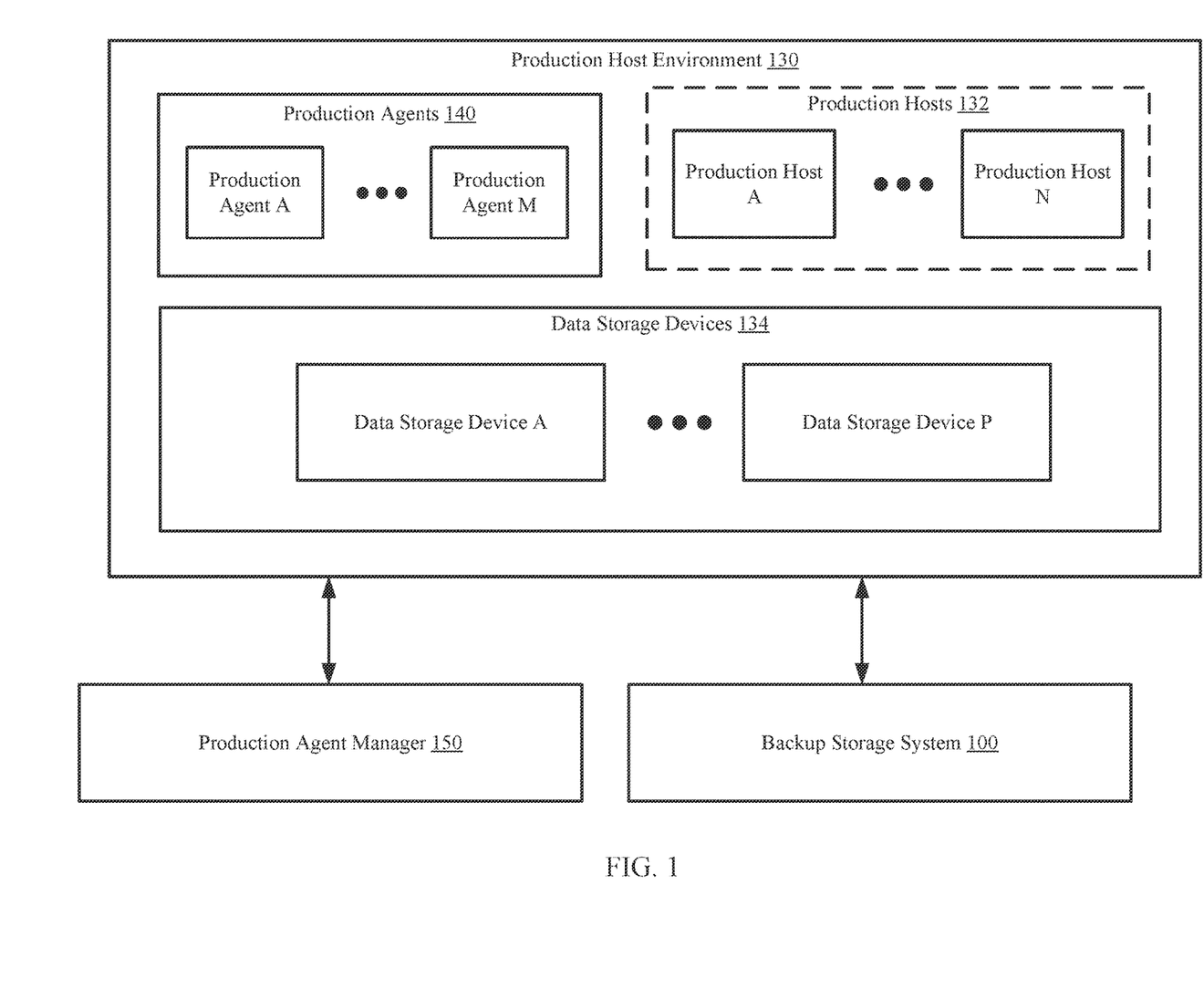
FIG. 1 shows a diagram of a system in accordance with one or more embodiments of the invention.

FIG. 1 shows an example system in accordance with one or more embodiments of the invention. The system includes production host environment (130), a production agent manager (150), and a backup storage system (100). The production host environment (130) includes one or more production hosts (132), production agents (140), and data storage devices (134). Each component of the system of FIG. 1 may be operably connected via any combination of wired and/or wireless connections. Each component of the system is discussed below.

In one or more embodiments of the invention, the production hosts (132) in the production host environment (130) host virtual machines. The virtual machines (shown in FIG. 2) may be logical entities executed using computing resources (not shown) of the production hosts. The virtual machines may operate using data stored in the data storage devices (134).

Figure 2:
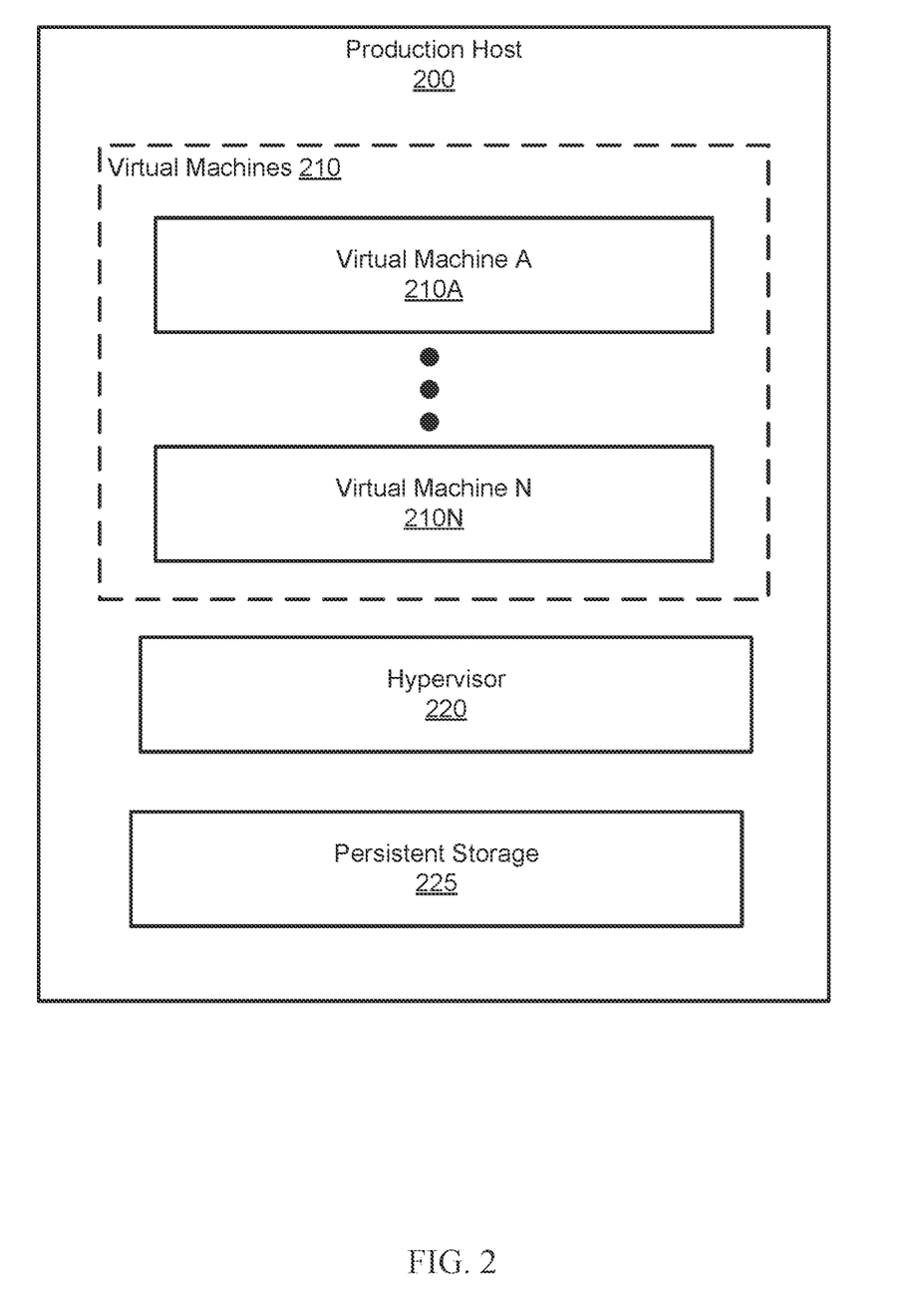
FIG. 2 shows a diagram of a production host in accordance with one or more embodiments of the invention.

For additional details regarding the production hosts (132), refer to FIG. 2.

In one or more embodiments of the invention, the production agents (140) control, directly or indirectly, the operation of the production hosts (132) and/or applications executing thereon. In particular, the production agents (130) may include functionality for generating backups of the virtual machines executing on the production hosts (132). Further, the production agents (140) may include functionality for restoring the virtual machines to previous points in time based on the generated backups. The virtual machines on which each production agent operates may be based on the data storage device (134) assigned to each production agent and/or virtual machine. For example, the data accessed by a virtual machine may be stored in one of the data storage devices (134). The production agent operating in the same data storage device as the virtual machine may execute the data protection services for that virtual machine.

While illustrated as separate entities, each of the production agents (140) may operate using any one of the data storage devices (134), using any one of the production hosts (132), and/or using any other entity without departing from the invention. The allocation of a production agent to a data storage device may be determined by performing the methods of FIGS. 3A-3B.

In one or more embodiments of the invention, the data storage devices (134) manage and store data. The data may be virtual machine data. In other words, the data may be data generated, stored, and/or otherwise accessed by one or more virtual machines.

In one or more embodiments of the invention, the data storage devices (134) provide resources to the production agents (140). The resources may include, for example, storage, memory, processing, and/or any other computing resources without departing from the invention.

While each of the data storage devices (134) are illustrated as being separate from the production hosts (132), one or more of the production hosts (132) may host one or more of the data storage devices (134).

Figure 5:
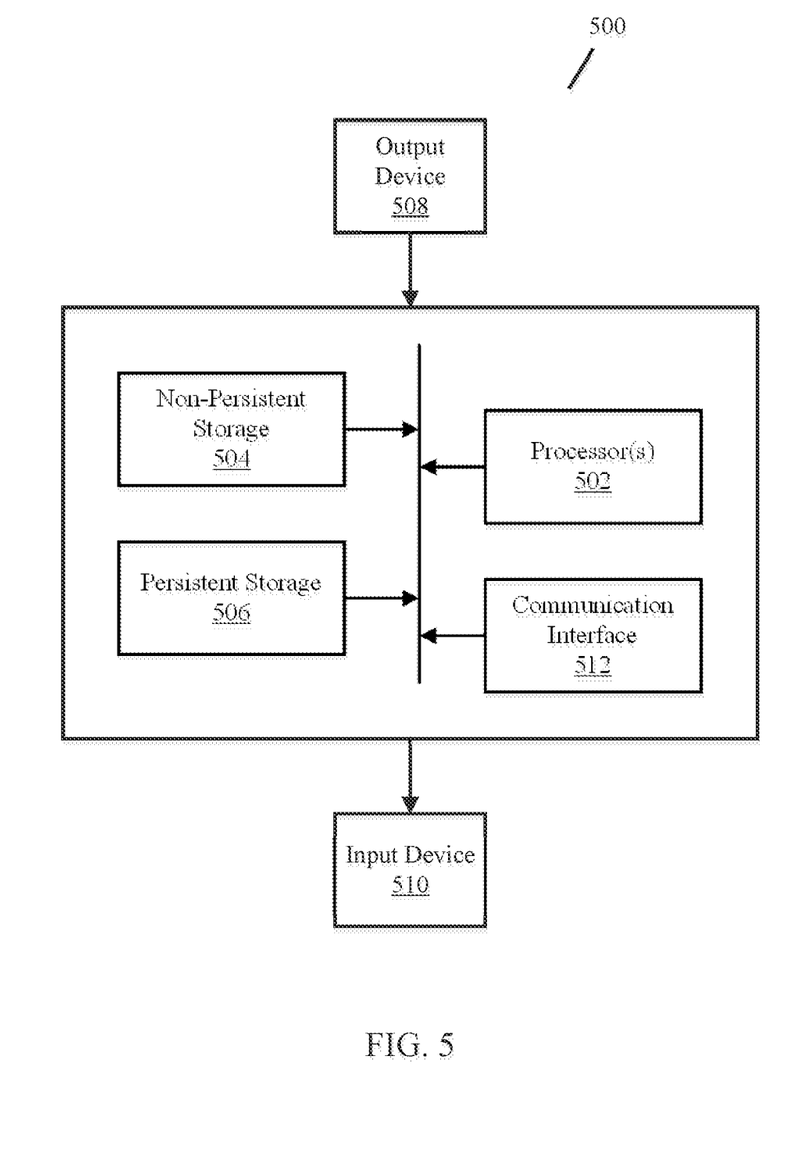
FIG. 5 shows a diagram of a computing device in accordance with one or more embodiments of the invention.

In one or more embodiments of the invention, each of the data storage devices (134) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of a data storage device described throughout this application.

In one or more embodiments of the invention, each of the data storage devices (134) is implemented as a logical device. The logical device may utilize the computing resources of any number of computing devices and thereby provide the functionality of a data storage device described throughout this application.

In one or more embodiments of the invention, the backup storage system (100) stores data and/or provides stored data. The data may be, for example, backups. The backups may be representations of data generated by, or otherwise associated with, the virtual machines discussed above. The backups may be used to restore virtual machines to prior states. The backup storage system (100) may obtain the backups from the production agents (140). The backup storage system (100) may store additional data without departing from the invention.

In one or more embodiments of the invention, the backup storage system (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage system (100) described throughout this application.

In one or more embodiments of the invention, the backup storage system (100) is implemented as a logical device. The logical device may utilize the computing resources of any number of computing devices and thereby provide the functionality of the backup storage system (100) described throughout this application.

In one or more embodiments of the invention, the production agent manager (150) manages the deployment of the production agents (140) in the production host environment (132). In one or more embodiments of the invention, the production agent manager (150) may manage the deployment of the production agents (140) by evaluating the data storage devices (134) to determine a health score of each data storage device. The health scores may be used to assign a production agent to a data storage device. As used herein, assigning a production agent refers to deploying the production agent to operate in a data storage device such that the production agent utilizes the resources (e.g., storage, processing, memory, etc.) of the assigned data storage device to perform the aforementioned functionality of the production agents (140). The production agent manager (150) may assign the production agents (140) in accordance with FIGS. 3A-3B.

In one or more embodiments of the invention, the production agent manager (150) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production agent manager (150) described throughout this application.

In one or more embodiments of the invention, the production agent manager (150) is implemented as a logical device. The logical device may utilize the computing resources of any number of computing devices and thereby provide the functionality of the production agent manager (150) described throughout this application.

FIG. 2 shows a diagram of a production host (200) in accordance with one or more embodiments of the invention. The production host (200) may be similar to a production host (132, FIG. 1) discussed above. As discussed above, the production host may host virtual machines (210). The production host (200) may further include a hypervisor (220) and persistent storage (225). Each of these components is discussed below.

Each of the virtual machines (210A, 210N) may be performing similar or different processes. In one or more embodiments of the invention, the virtual machines (210) provide services to users, e.g., clients (not shown). For example, the virtual machines (210) may host instances of databases, email servers, and/or other applications. The virtual machines (210) may host other types of applications without departing from the invention. In one or more embodiments of the invention, the virtual machines (210A, 210N) issue input/output (I/O) requests to store data in a persistent storage (225).

In one or more embodiments of the invention, the virtual machines (210A, 210N) are implemented as computer instructions, e.g., computer code, stored on a persistent storage (e.g., on the production host) that when executed by a processor(s) of the production host (200) cause the production host (200) to provide the functionality of the virtual machines (210A, 210N) described throughout this application.

In one or more embodiments of the invention, the production host (200) includes a hypervisor (220) that orchestrates the operation of the virtual machines (210). The hypervisor (220) may orchestrate the operation of the virtual machines (210A, 210N) by allocating computing resources to each of the virtual machines (210A, 210N).

In one or more embodiments of the invention, the hypervisor (220) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (220) described throughout this application.

In one or more of embodiments of the invention, the hypervisor (220) is implemented as computer instructions, e.g., computer code, stored on a persistent storage that when executed by a processor of the production host (200) causes the production host (200) to provide the functionality of the hypervisor (220) described throughout the application.

In one or more embodiments of the invention, the persistent storage (225) is a storage device that stores data structures. The persistent storage (225) may be a physical or virtual device. For example, the persistent storage (225) may include solid state drives, solid state drives, tape drives, and other components to provide data storage functionality. Alternatively, the persistent storage (225) may be a virtual device that utilizes the physical computing resources of other components to provide data storage functionality.

Figure 3A:
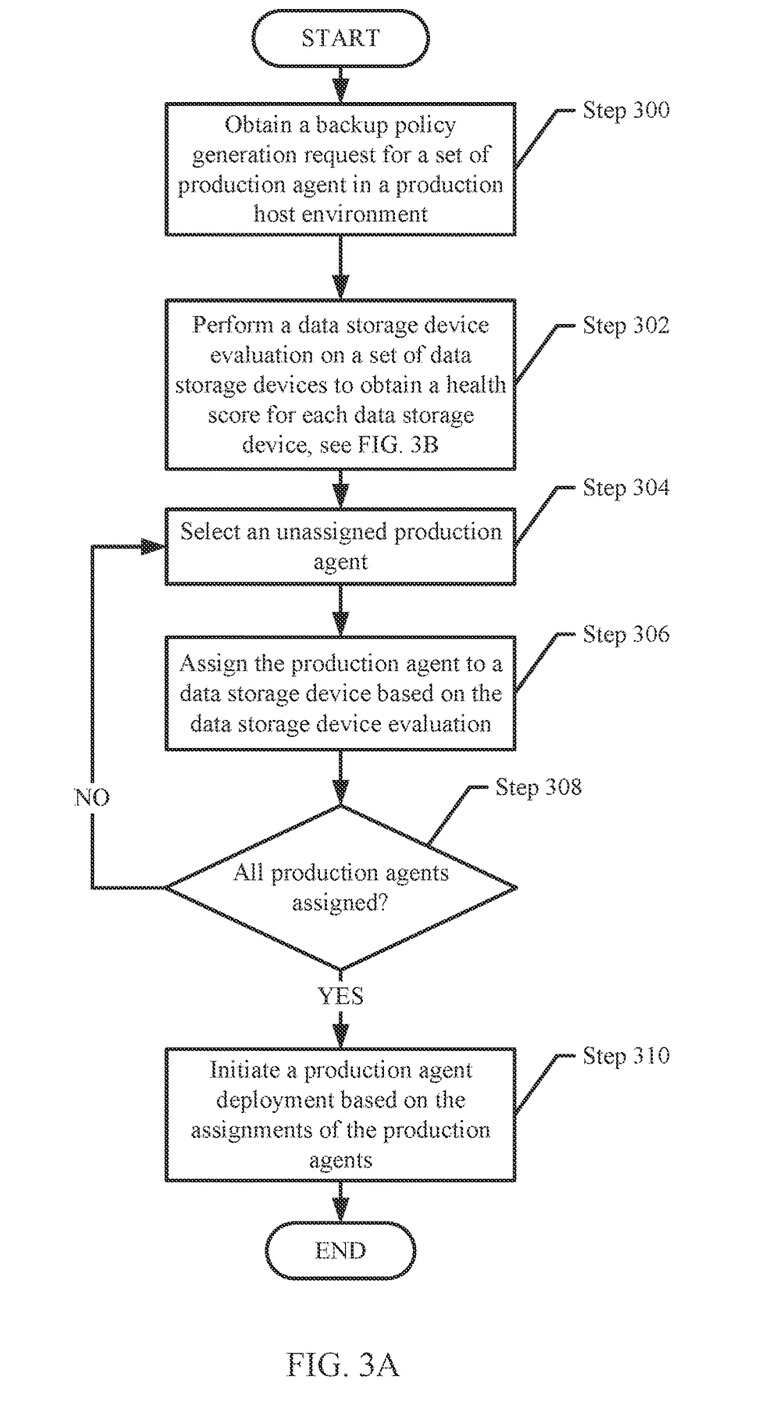
FIG. 3A shows a flowchart for performing a backup in accordance with one or more embodiments of the invention.

FIG. 3A shows a flowchart for performing a backup in accordance with one or more embodiments of the invention. The method shown in FIG. 3A may be performed by, for example, a production agent manager (150, FIG. 1). Other components of the system illustrated in FIG. 1 may perform the method of FIG. 3A without departing from the invention.

Turning to FIG. 3A, in step 300, a backup policy generation request is obtained for a set of production agents. In one or more embodiments of the invention, the backup policy generation request specifies deploying one or more production agents in the production host environment. The deployment may include assigning each production agent to a data storage device in the production host environment. As discussed above, the production agent assigned to a data storage device may utilize the computing resources of the data storage device to perform the data protection services of the production agent discussed throughout.

In step 302, a data storage device evaluation is performed on a set of data storage devices to obtain a health score for each data storage device. In one or more embodiments of the invention, the data storage device evaluation is an evaluation of the health of each of the set of data storage devices. The health of a data storage device may be represented using a health score. In one or more embodiments of the invention, a health score is a numerical representation of the capability of a data storage system. The health score may be based on any number of data storage system parameters (discussed in FIG. 3B).

Figure 3B:
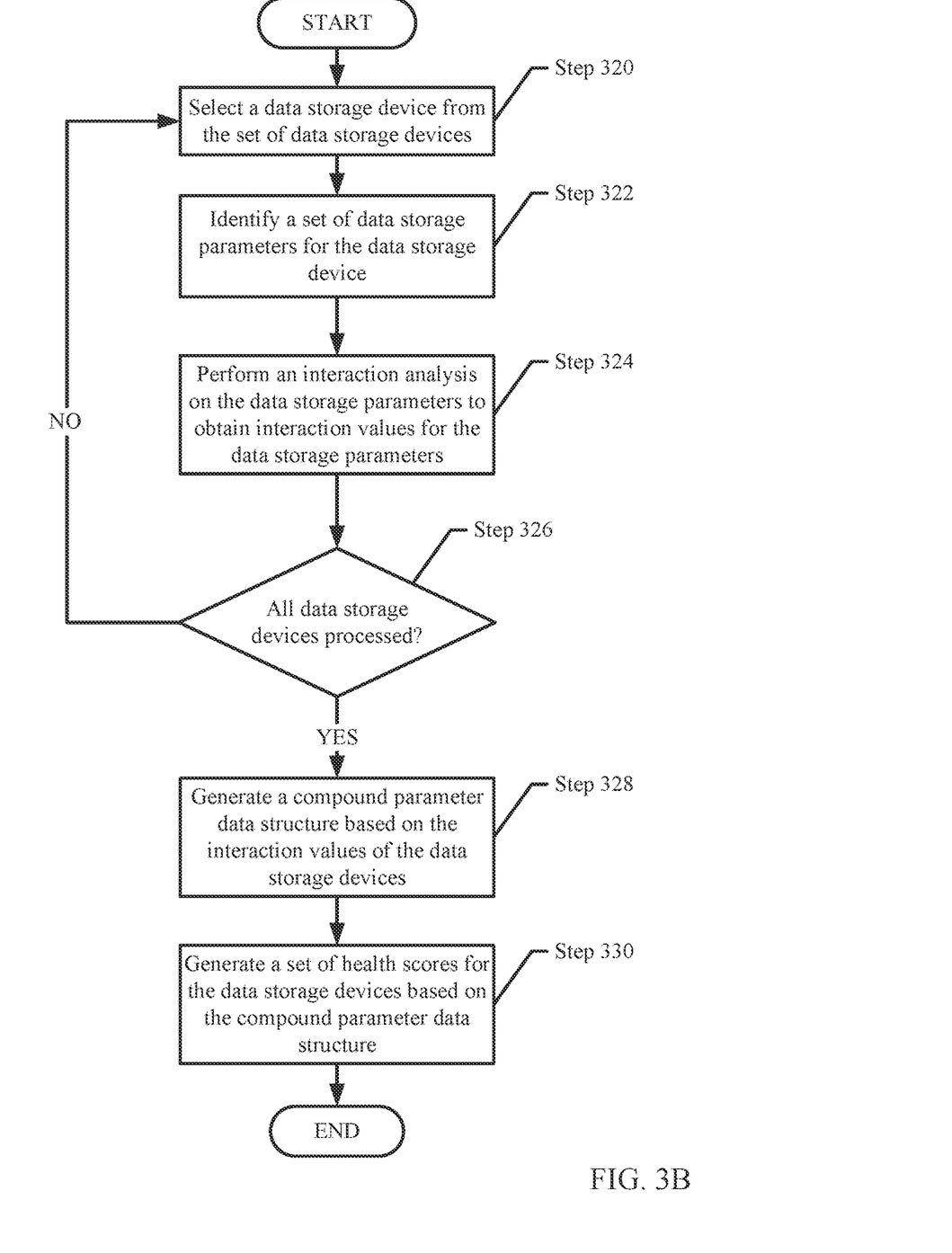
FIG. 3B shows a flowchart for performing a data storage device evaluation in accordance with one or more embodiments of the invention.

In one or more embodiments of the invention, the data storage device evaluation is performed using the method illustrated in FIG. 3B. The data storage device evaluation may be performed via any other methods without departing from the invention.

In step 304, an unassigned production agent is selected. In one or more embodiments of the invention, the selection of a production agent is based on a priority applied to the production agents to be deployed. For example, the backup policy generation request may specify the priority of the production agents to be deployed. The selection of the production agent may be based on any selection mechanism without departing from the invention. For example, the selection may be random.

In step 306, the production agent is assigned to a data storage device based on the data storage device evaluation. In one or more embodiments of the invention, the production agent is assigned by ranking each data storage device based on the generated health scores. The data storage devices with the higher health scores are ranked higher than the data storage devices with lower health scores. Following the ranking of the data storage devices, the production agent is assigned to a highest-ranking data storage device.

In step 308, a determination is made about whether all production agents in the set of production agents are assigned. If all production agents are assigned, the method proceeds to step 310; otherwise, the method proceeds to step 304.

In step 310, following the determination that the production agents are all assigned to a data storage device, a production agent deployment is initiated. In one or more embodiments of the invention, the production agent deployment includes installing the production agent to a production host, or other entity, hosting the data storage system. The installation may be performed such that the production agent may utilize the computing resources of the data storage device to perform any backup restorations, and/or other data protection services for virtual machines operating using the assigned data storage device as discussed above.

FIG. 3B shows a flowchart for performing a data allocation analysis in accordance with one or more embodiments of the invention. The method shown in FIG. 3B may be performed by, a production agent (140, FIG. 1). Other components of the system illustrated in FIG. 1 may perform the methods of FIG. 3B without departing from the invention.

In step 320, a data storage device is selected from the set of data storage devices. In one or more embodiments of the invention, the selection of the data storage device may be random. The data storage device may be one that is unprocessed. Any selection mechanism may be applied to select the data storage device without departing from the invention.

In step 322, a set of data storage parameters is identified for the selected data storage devices. In one or more embodiments of the invention, the set of data storage parameters are characteristics of the data storage device that may be used to, at least for a portion of the characteristics, define a comprehensive representation of the health of the data storage device.

Examples of data storage parameters include, but are not limited to: a status of the data storage device (e.g., whether the data storage device is active, unused, etc.), whether the data storage device is part of a cluster of data storage devices, a measurement of consumed processing power, a version of a virtual machine file system, a type of storage device (e.g., hard disk drive (HDD), solid state drive, and a total storage capacity of the data storage device.

In step 324, an interaction analysis is performed on the data storage parameters to obtain interaction values for the data storage parameters. In one or more embodiments of the invention, the interaction analysis is a process for identifying relationships between data storage parameters and whether related data storage parameters may be used to determine the health score of a data storage device. The interaction analysis may include evaluating two data storage parameters, making a determination that the two data storage parameters have a correlation. Such a determination may be based on sets of data storage parameters of multiple data storage devices. For example, the data storage parameters for a first data storage device may specify a high storage availability and a storage type of solid state drive. Further, a set of data storage parameters for a second data storage device may specify high storage availability and a storage type of solid state drive. Due to the identification of two data storage devices with a two similar data storage parameters, it may be determined that the pair consisting of the storage type and the total availability may correspond to a high interaction value. Each pair of data storage parameters may be evaluated accordingly to generate the set of interaction values.

In step 326, a determination is made about whether all data storage devices are processed. If all data storage devices are processed, the method proceeds to step 328; otherwise, the method proceeds to step 320.

In step 328, a compound parameter data structure is generated based on the interaction values of the data storage devices. In one or more embodiments of the invention, the compound parameter data structure is a data construct that specifies all interaction values for each pair of data storage parameters for each data storage device. The interaction values may be ordered from highest value (e.g., highest relationships between a pair of data storage parameters of a data storage device) to lowest value. In addition to the interaction values, the compound parameter data structure may specify a health value for each data storage parameter. The health value may be generated based on a benefit of the data storage parameter to a storage device. For example, a high amount of total storage availability may be of high benefit. Therefore, a data storage parameter that specifies a high storage availability may be specified with a high health value.

In step 330, a set of health scores is generated for the data storage devices based on the compound parameter data structure. In one or more embodiments of the invention, the health scores are generated by comparing the health values of data storage parameters and generating an average of health values of the data storage parameters. For pairs of data storage parameters with high interaction values, one of the two data storage parameters may be considered when evaluating the health scores. In this manner, data parameters with independent relationships may be considered when evaluating the health score.

EXAMPLE

Figure 4:
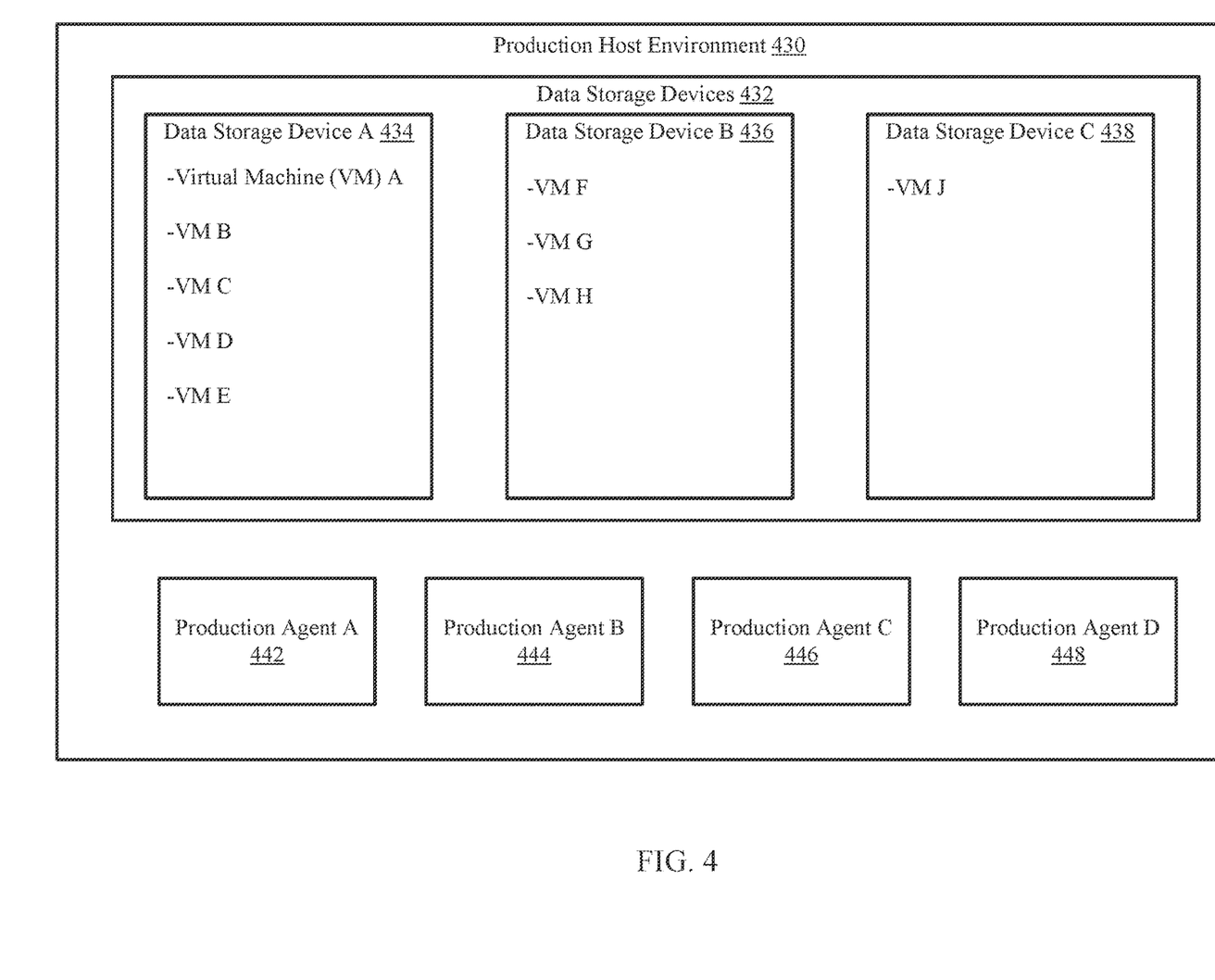
FIG. 4 show an example in accordance with one or more embodiments of the invention.

The following section describes an example. The example is not intended to limit the invention. Turning to the example, consider a scenario in which four production agents are to be assigned in a production host environment. FIG. 4 shows an example system including a production host environment (430) that includes three data storage devices (432). Each data storage device (434, 436, 438) is part of a cluster, and stores virtual machine data for a number of virtual machines. Data storage device A (434) stores data for VMs A, B, C, D, and E. Data storage device B (436) includes data for VMs F, G, and H. Data storage C (438) includes data for VM J.

At a point in time, a backup policy generation request is obtained by a production agent manager (not shown) that specifies assigning each of four production agents (442, 444, 446, 448) to a data storage device (432). The production agent manager performs the method of FIGS. 3A-3B to evaluate each of the data storage devices (432) to generate a set of health scores for each of the data storage devices (432). Specifically, the production agent manager identifies a set of data storage parameters for each data storage device (434, 436, 438). The set of data storage parameters specify the VMs utilizing each data storage device (434, 436, 438). Further, the set of data storage parameters specifies the total available storage capacity of each data storage device (434, 436, 438). Data storage device A (434) includes 1 terabyte (TB) of available data. Data storage device B (436) includes 10 TB of available data. Data storage C (438) includes 5 TB of available data. Additionally, the set of data storage devices specifies the drive type of each data storage device. Specifically, data storage device A (434) and data storage device C (438) utilize solid-state disks, and data storage device B (436) utilizes hard disk drives.

Following the identification of the data storage parameters for each of the data storage devices (432), an interaction analysis is performed on the data storage parameters to determine interaction values for each pair of data storage parameters. An interaction value between the available data of data storage A (434) and the data storage type is determined to be high. Similarly, the interaction value between the available data of data storage C (438) and its data storage type is determined to be high. The interaction values of the remaining data storage parameter pairs are determined to be of moderate level. These interaction values are maintained in a compound parameter data structure. Further, the compound parameter data structure specifies a health value of each data storage parameter of each data storage device. For example, the 10 TB of storage availability of data storage B (436) is associated with a high health value. Further, the low number of VMs operated on data storage C (438) is associated with a high health value.

The compound parameter data structure is used to generate the health scores of each data storage device. Data storage device A (434) is evaluated with a health score of 0.1 out of a maximum of 1.0. The health score is based on the low storage availability and high number of VMs operating on the data storage device relative to the other data storage devices (432). Data storage device B (436) is evaluated with a health score of 0.6. The health score is based on the moderate number of VMs and the high storage availability. Data storage device C (438) is evaluated with a health score of 0.9. The health score is based on the low number of VMs and the moderate storage availability.

Based on the aforementioned evaluations, the production agents are each assigned to one of the data storage devices (432). Specifically, production agent A (442), production agent B (444), and production agent C (446) are assigned to data storage C (438). Production agent D (448) is assigned to data storage B (436). In this manner, data storage C (438), having the highest health score, is assigned to the most number of production agents. Data storage B (436), having a moderately high health score, is assigned to one production agent. Data storage A (434), having the lowest relative health score, is not assigned any production agents.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention may improve the efficiency of assigning production agents that perform backup operations on virtual machines. The assigning of production agents is improved by ranking the data storage devices on which the production agents operate. The ranking of the data storage devices enable the production agents to operate on a data storage device that is capable of providing sufficient computing resources to the production agent. In this manner, the production agent is not assigned to a data storage device that may not be able to provide the required computing resources.

Thus, embodiments of the invention may address the problem of inefficient use of computing resources in a distributed computing environment. This problem arises due to the technological nature of the environment in which backup services are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for processing backup policy generation requests, the method comprising:
   receiving, by a production agent manager, a backup policy generation request;
   in response to receiving the backup policy generation request:
      identifying a backup to transfer to a backup storage, wherein the backup comprises a plurality of data blocks;
      performing, based on a shapely additive explanation (SHAP) model, a data storage device evaluation on a set of data storage devices to obtain a set of health scores,
         wherein each health score of the set of health scores corresponds to a data storage device of the set of data storage devices;
      assigning, based on the set of health scores, a production agent to a data storage device of the set of data storage devices to generate a backup policy; and
      initiating, based on the backup policy, a deployment of the production agent to the data storage device.

2. The method of claim 1, wherein performing, based on the SHAP model, the data storage device evaluation comprises:
   identifying a first set of data storage device parameters for a first data storage device;
   performing an interaction analysis on the first set of data storage device parameters to obtain interaction values for the first data storage device;
   identifying a second set of data storage device parameters for a second data storage device;
   performing a second interaction analysis on the second set of data storage device parameters to obtain second interaction values for the second data storage device;
   generating a compound parameter data structure using the first interaction values and the second interaction values; and
   generating the set of health scores based on the compound parameter data structure.

3. The method of claim 2, wherein the first set of data storage device parameters comprises at least one of: a status of the data storage device, whether the data storage device is part of a cluster, a measurement of consumed processing power, a version of a virtual machine file system, a type of storage device, and a total storage capacity.

4. The method of claim 3, wherein the first set of data storage device parameters further comprises a total number of virtual machines assigned to the data storage device.

5. The method of claim 3, wherein the first set of data storage device parameters further comprises a total number of production agents assigned to the data storage device.

6. The method of claim 1, wherein assigning the production agent to the data storage device comprises:
   ranking each data storage device in the set of data storage devices based on the set of health scores;
   making a determination that the data storage device is the highest ranked; and
   based on the determination, assigning the production agent to the data storage device.

7. The method of claim 1, wherein initiating the production agent deployment comprises enabling the production agent to utilize computing resources of the data storage device.

8. A system, comprising:
   a processor; and
   memory comprising instructions, which when executed by the processor, perform a method, the method comprising:
      receiving a backup policy generation request;
      in response to receiving the backup policy generation request:
         identifying a backup to transfer to a backup storage, wherein the backup comprises a plurality of data blocks;
         performing, based on a shapely additive explanation (SHAP) model, a data storage device evaluation on a set of data storage devices to obtain a set of health scores, wherein each health score of the set of health scores corresponds to a data storage device of the set of data storage devices;
         assigning, based on the set of health scores, a production agent to a data storage device of the set of data storage devices to generate a backup policy; and
         initiating, based on the backup policy, a deployment of the production agent to the data storage device.

9. The system of claim 8, wherein performing, based on the SHAP model, the data storage device evaluation comprises:
   identifying a first set of data storage device parameters for a first data storage device;
   performing an interaction analysis on the first set of data storage device parameters to obtain interaction values for the first data storage device;
   identifying a second set of data storage device parameters for a second data storage device;
   performing a second interaction analysis on the second set of data storage device parameters to obtain second interaction values for the second data storage device;
   generating a compound parameter data structure using the first interaction values and the second interaction values; and
   generating the set of health scores based on the compound parameter data structure.

10. The system of claim 9, wherein the first set of data storage device parameters comprises at least one of: a status of the data storage device, whether the data storage device is part of a cluster, a measurement of consumed processing power, a version of a virtual machine file system, a type of storage device, and a total storage capacity.

11. The system of claim 10, wherein the first set of data storage device parameters further comprises a total number of virtual machines assigned to the data storage device.

12. The system of claim 10, wherein the first set of data storage device parameters further comprises a total number of production agents assigned to the data storage device.

13. The system of claim 8, wherein assigning the production agent to the data storage device comprises:
   ranking each data storage device in the set of data storage devices based on the set of health scores;
   making a determination that the data storage device is the highest ranked; and
   based on the determination, assigning the production agent to the data storage device.

14. The system of claim 8, wherein initiating the production agent deployment comprises enabling the production agent to utilize computing resources of the data storage device.

15. A non-transitory computer readable medium comprising computer readable program code, which when executed by a computer processor enables the computer processor to perform a method, the method comprising:
   receiving, by a production agent manager, a backup policy generation request;
   in response to receiving the backup policy generation request:
      identifying a backup to transfer to a backup storage, wherein the backup comprises a plurality of data blocks;
      performing, based on a shapely additive explanation (SHAP) model, a data storage device evaluation on a set of data storage devices to obtain a set of health scores, wherein each health score of the set of health scores corresponds to a data storage device of the set of data storage devices;
      assigning, based on the set of health scores, a production agent to a data storage device of the set of data storage devices to generate a backup policy; and
      initiating, based on the backup policy, a deployment of the production agent to the data storage device.

16. The non-transitory computer readable medium of claim 15, wherein performing, based on the SHAP model, the data storage device evaluation comprises:
   identifying a first set of data storage device parameters for a first data storage device;
   performing an interaction analysis on the first set of data storage device parameters to obtain interaction values for the first data storage device;
   identifying a second set of data storage device parameters for a second data storage device;
   performing a second interaction analysis on the second set of data storage device parameters to obtain second interaction values for the second data storage device;
   generating a compound parameter data structure using the first interaction values and the second interaction values; and
   generating the set of health scores based on the compound parameter data structure.

17. The non-transitory computer readable medium of claim 16, wherein the first set of data storage device parameters comprises at least one of: a status of the data storage device, whether the data storage device is part of a cluster, a measurement of consumed processing power, a version of a virtual machine file system, a type of storage device, and a total storage capacity.

18. The non-transitory computer readable medium of claim 17, wherein the first set of data storage device parameters further comprises a total number of virtual machines assigned to the data storage device.

19. The non-transitory computer readable medium of claim 17, wherein the first set of data storage device parameters further comprises a total number of production agents assigned to the data storage device.

20. The non-transitory computer readable medium of claim 15, wherein assigning the production agent to the data storage device comprises:
   ranking each data storage device in the set of data storage devices based on the set of health scores;
   making a determination that the data storage device is the highest ranked; and
   based on the determination, assigning the production agent to the data storage device.

* * * * *